(12) United States Patent
Delmoro et al.

(10) Patent No.: US 6,568,258 B1
(45) Date of Patent: May 27, 2003

(54) ROAD WHEEL READER

(75) Inventors: Richard L. Delmoro, Tallmadge, OH (US); Dave Krause, Hartville, OH (US)

(73) Assignee: Akron Special Machinery, Inc., Akron, OH (US)

( * ) Notice: Subject to any disclaimer, the term of this patent is extended or adjusted under 35 U.S.C. 154(b) by 337 days.

(21) Appl. No.: 09/624,110

(22) Filed: Jul. 24, 2000

(51) Int. Cl.[7] .............................................. G01M 17/02
(52) U.S. Cl. ........................................................ 73/146
(58) Field of Search ............................... 73/146, 146.2, 73/146.3, 146.4, 146.5, 146.8; 451/24, 1

(56) References Cited

U.S. PATENT DOCUMENTS 5,022,186 A * 6/1991 Rogers, Jr. ..................... 451/1
5,099,613 A * 3/1992 Rogers, Jr. .................... 451/24
6,016,695 A * 1/2000 Reynolds et al. ............. 73/146
6,035,709 A * 3/2000 Barnette, Jr. ................. 73/146

OTHER PUBLICATIONS

Heidenhahn General Catalog, pp. 22–33 (Jan. 1998).
SIKO Products Catalog, pp. 14, 17, and 23 (Apr. 1997).

* cited by examiner

Primary Examiner—Hezron Williams
Assistant Examiner—Andre Allen
(74) Attorney, Agent, or Firm—Reese Taylor

(57) ABSTRACT

A tire uniformity machine having a processor and a load wheel rotatably mounted within a frame, the tire uniformity machine including non-visible indicia adjacent the load wheel; and a sensor operatively located with respect to the indicia and in communication with the processor, wherein the sensor detects the presence of the indicia during the rotation of the load wheel.

20 Claims, 3 Drawing Sheets

ROAD WHEEL READER

RELATED PATENT APPLICATIONS

None.

FIELD OF THE INVENTION

The present invention relates to a tire testing apparatus used to measure tire uniformity and load wheel alignment. More particularly, the present invention relates to such an apparatus having a sensor assembly for measuring the angular velocity of the road wheel. Most particularly, the present invention relates to such an apparatus having non-visible indicia on the surface of the load wheel and a sensor for detecting the indicia as the tire rotates.

BACKGROUND OF THE INVENTION

Tire uniformity machines are used to test tires for quality and to repair minor detected defects in the tire. Uniformity machines employ a load wheel in contact with the test tire. Contact between the load wheel and the tire conveys information concerning the tire's structural characteristics to a plurality of sensors mounted within the load wheel. Apart from the load wheel sensors, optical sensors measure the surface of the tire, tire velocity, and tire and load wheel alignment.

Known-optical sensors used to measure the angular or rotational velocity of the load wheel employ drums or discs containing visible graduations, which typically reflect or block light. The optical sensor detects the passage of these graduations and translates them into rotational velocity. The discs or drums can add substantial weight to the load wheel increasing the load on the load wheel drive motor and further change the inertia and dynamic balance of the load wheel itself, which may affect the load wheel's response to the test tire.

As a further disadvantage, when defects, such as protrusions or other structural irregularities in the tire, are detected grinding elements located about the tire are used to remove or even out these defects. As can be appreciated, the grinders generate large quantities of tire particulate. These particles are suspended to an extent by their initial momentum and air currents generated by the tire, load wheel, and grinders. The suspended particulate interferes with the optical sensors interrupting the optical path between the sensor and the tire. Further, the grinding process heats the rubber particles making them tacky. In some instances, the tacky particles adhere to the optical sensors and can occlude the sensor optics. More commonly, these tacky particles fall onto the disc or drum and adhere to its surface covering the encoder's graduations making them difficult or impossible to detect. As will be readily appreciated, any interruption of the sensor's ability to detect these gradations results in inaccurate measurement of the rotational velocity.

A further disadvantage of optical sensors is the very small gap of about 0.004 inches between the rotating scale and the fixed sensors. This increases the potential for contact between the members resulting in permanent damage to the scale or the sensor.

Therefore, a need exists for an encoder that does not rely on optical sensors to measure tire and load wheel characteristics in a uniformity machine. A separate need exists for an encoder that measures the rotational velocity of the load wheel near its surface.

SUMMARY OF THE INVENTION

At least one object of the present invention, therefore, is to provide a road wheel reader that does not rely on optical sensors to measure load wheel angular velocity in a uniformity machine.

Another object of the present invention is to provide such a reader having a sensor for detecting magnetic particles carried on the surface of the load wheel, wherein the magnetic particles are spaced at regular intervals generating a series of pulses which the sensor uses to measure the tire surface characteristics.

In furtherance of at least one of these objects, the present invention provides a tire uniformity machine having a load wheel rotatably mounted within a frame, the tire uniformity machine including non-visible indicia adjacent the load wheel, and a sensor operatively located with respect to the indicia, wherein the sensor detects the presence of the indicia during the rotation of the load wheel.

The present invention further provides in a tire uniformity machine having a load wheel, an encoder assembly including a plurality of non-visible indicia carried by the load wheel and a sensor for detecting the indicia, wherein the sensor is in communication with a processor.

The present invention further provides in a tire uniformity machine having a load wheel and a processor, an encoder including a magnetic tape carried on an outer surface of the load wheel and axially located proximate the edge of the load wheel and a sensor operatively located with respect to the tape, the sensor communicating with the processor.

Accordingly, production of an improved road wheel reader of the character described becomes the principal object of this invention with other objects thereof becoming more apparent upon a reading of the following brief specifications, considered and interpreted in view of the accompanying drawings.

PREFERRED EMBODIMENT FOR CARRYING OUT THE INVENTION

Figure 1:
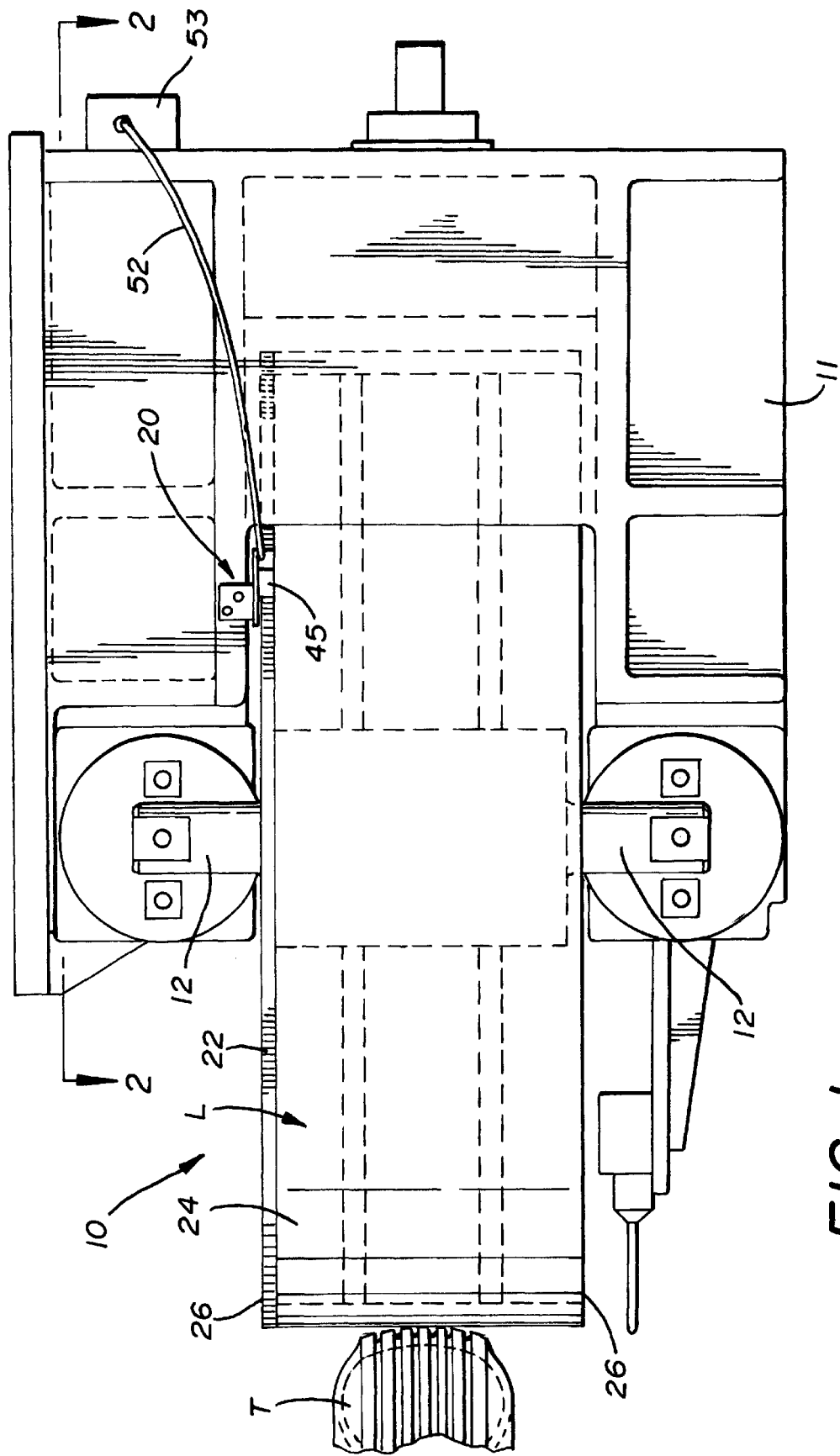
FIG. 1 is a partially schematic side elevational view of a tire uniformity machine according to the present invention showing a suitably mounted load wheel having a tape containing magnetic particles mounted in one suitable position on the load wheel and a detector operatively positioned with the tape.

Referring to FIG. 1, it will be seen that a tire uniformity machine, generally indicated by the numeral 10, is essentially conventional in construction and well-known in the art. As such, it will be described in general terms only.

To that end, the tire uniformity machine 10 includes a plurality of frame members 11 forming a framework for the machine and its various components.

Mounted on this framework is a conveyor of a known type which generally includes a plurality of rolls which enable a tire T to be brought into position with the opposed chucks of the machine and then removed therefrom following testing.

It is well-known in the art that machines of this type generally include a vertically fixed but rotatable upper chuck assembly and a vertically moveable lower chuck assembly.

The upper chuck assembly includes a chuck secured to a spindle which is rotatable during operation of the machine by means of a motor and a chain or belt drive assembly, all of which are essentially conventional in construction. Inflation means are also provided and generally include a connection to a source of air pressure and communication with the interior of the closed chucks for inflation purposes. This entire arrangement is well-known in the art and will not be described or illustrated in detail herein. A load wheel L is also provided on the frame work and is rotationally mounted on a spindle 12 which are in turn, mounted on a carriage which can move radially inwardly and outwardly toward and away from the tire T, and, thus, into and out of engagement with tire T. To that end, a reversible motor and gear reduction unit is connected to a chain drive and screw arrangement. Thus, once the tire T has been chucked and inflated, the load wheel L can be moved into and out of engagement with it as required.

All of the previously described structure is basically conventional and well-known in the art and has, therefore, been essentially illustrated somewhat schematically since one of ordinary skill in this art would readily understand the structure involved.

With reference to FIG. 1, the load wheel L is shown rotationally mounted on spindles in frame 11. During testing, the rotational speed of load wheel L may be used to generate valuable information concerning the tire being tested. As will be readily appreciated, variations in the rotational speed of the load wheel L in response to the rotation of the tire T may indicate irregularities on the surface of the test tire. To measure the rotational speed of the load wheel L, load wheel L is provided with a magnetic encoding assembly generally indicated by 20.

Figure 3:
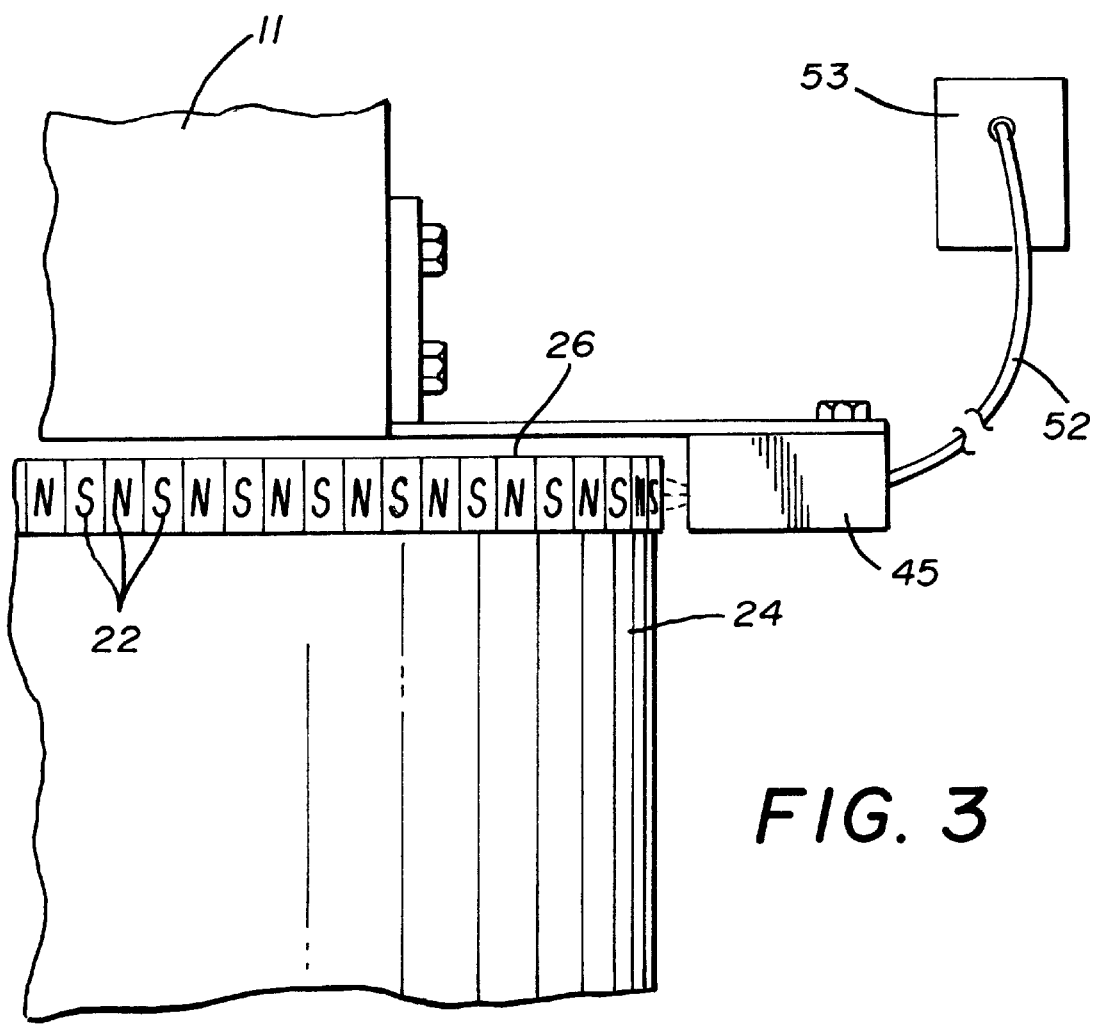
FIG. 3 is a fragmental view as might be seen along line three-three in FIG. 2 enlarged to show schematically the alternating polarity of the magnetic particles and the positioning of the sensor with respect thereto.
Figure 4:
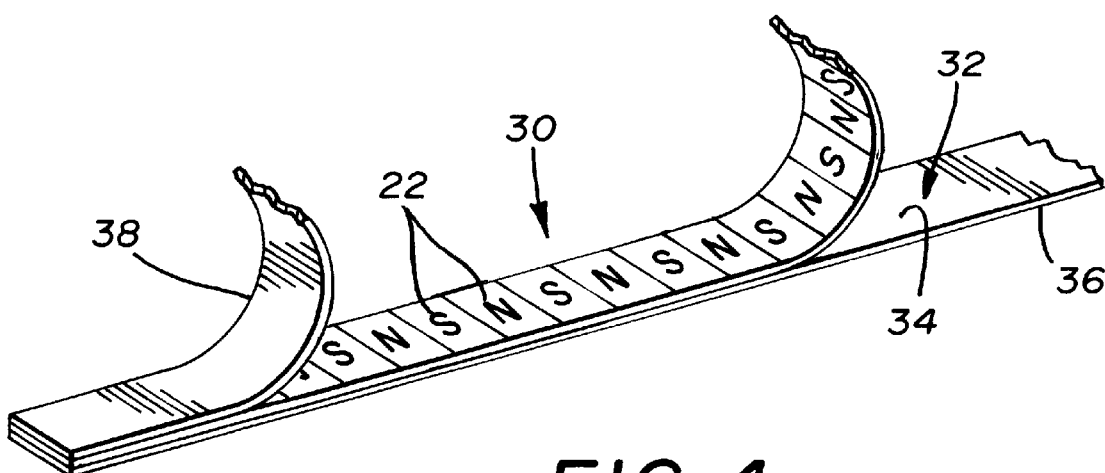
FIG. 4 is a partially schematic fragmented view of a magnetic tape according to the present invention having a double-sided adhesive layer, a magnetic partial layer and a protective covering.

The magnetic encoding assembly 20 includes a plurality of magnetic indicia 22, schematically depicted in FIGS. 1, 3 and 4, carried on the surface of the load wheel. As best shown in FIGS. 1, 3 and 4, the magnetic indicia 22 are preferably arranged with alternating polarity. The indicia 22 may be mounted at any point on the load wheel L and may be mounted on the outer surface 24 or inner surface 25 of load wheel L. As shown in FIG. 1, the indicia 22 may be mounted at any axial point on the load wheel L. It is preferably to carry the indicia 22 on the load wheel L such that they are not in contact with tire T. To that end, one suitable mounting location is near one of the edges 26 of load wheel L. The magnetic indicia 22 may be suitably attached with an adhesive or other known means.

A magnetic tape 30 (FIG. 4) may be used as an alternative to placing the indicia 22 on the surface of the load wheel L. As described above, the magnetic tape 30 would preferably carry magnetic indicia 22 in an alternating polarity configuration. In similar fashion to the magnetic indicia 22 described above, the magnetic tape 30 may be adhered to the load wheel L directly, or attached with a double-back tape 32. As shown in FIG. 4, the magnetic tape 30 may be carried by an adhesive tape 32 having adhesive (not shown) on a first and second side 34, 36. The first side 34 being in contact with the magnetic tape 30 and the second side 36 being used to adhere the magnetic tape 30 to the load wheel L. As can be further seen in FIG. 4, a protective layer 38 may be placed over the magnetic tape 30. Similarly, a second protective layer may be placed under the tape 30 between the magnetic tape 30 and the adhesive. Or, the magnetic tape 30 may be encapsulated in a protective sheathing and then adhered to the load wheel L with adhesive 33 or double-back tape 32 as previously described.

Figure 2:
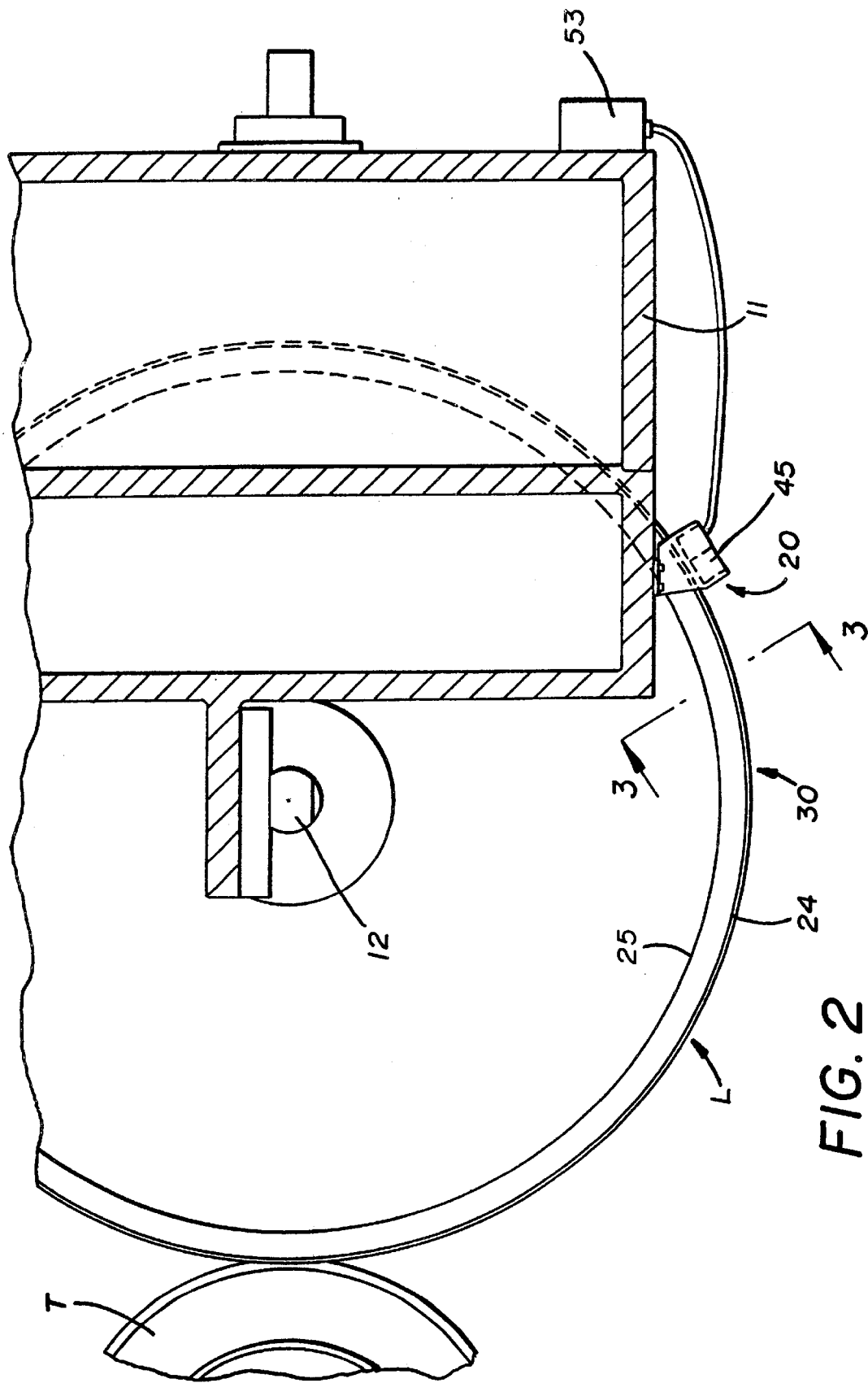
FIG. 2 is a fragmental partially sectional top elevational view showing a load wheel, tape, and sensor.

Once the magnetic tape 30 is located on the load wheel L, a detector 45, which houses a suitable sensor for detecting non-visible indicia, is located in an operative fashion with respect to the magnetic indicia 22. The proximity of the detector 45 to the magnetic indicia 22 or magnetic tape 30 as will be readily appreciated by one of ordinary skill, is a function of the detector 45 itself and therefore may vary according to the specifications of the detector manufacturer. Suitable detectors and sensors are common in the art. One example of such a detector is SIKO Product's MSK Magnetic Linear Encoder. The detector 45 may be held in operative contact by mounting it to a frame member 11 as shown in FIG. 2. In the embodiment shown in FIG. 2, the detector 45 may be placed at any location around the circumference 46 of load wheel L and may be carried on the frame of the uniformity machine 10 (FIG. 3) or mounted on a separate frame.

The detector 45 senses the changing polarity of the magnetic indicia 22 as they pass. The resolution of the detector 45 may be determined in part by the number and spacing of the north/south poles in the tape 30. For example, a large quantity of magnetic poles allows the detector 45 to measure very small increments of distance. An exemplary detector and tape having a large number of fine particles is shown in SIKO Products Catalog on pages 14 and 23 (April 1997), and is capable of detecting distances of about 0.01 millimeter. It should be understood that the particular application may not require this level of resolution and wider pole spacings may be used. For example, the load wheel may be divided into any number of segments as desired by spacing the poles around the load wheel circumference. In this way, a single sector may be formed, or it may be divided into halves, quarters, eighths and so on limited by the available pole spacing or other indicia's size.

The magnetic encoder assembly 20 operates much the same as a conventional encoder determining distances by detecting the indicia. In this case non-visible indicia such as magnetic indicia 22 are used. It will be appreciated that other known non-visible indicia including, but not limited to electrical or sonic indicia may be used. In all instances, the indicia are sensed or otherwise detected by detector 45, which creates a pulse that is sent to a processor 50 via a lead 52. The pulse generation of the detector 45 is then used to determine the velocity of the load wheel L or may be processed to generate other information. As is common in the art the detector pulse may be seen as a generally sinusoidal pulse train or simply a series of step functions. In the case of a sinusoidal function, the processor 50 may further resolve the sine wave, according to known functions, to obtain distance, velocity, or acceleration information.

While a full and complete description of the invention is set forth in accordance with the dictates of the patent statutes, it should be understood that modifications can be resorted to without departing from the spirit hereof or the scope of the appended claims.

What is claimed is:

1. A tire uniformity machine having a processor and a load wheel rotatably mounted within a frame, the tire uniformity machine comprising:

non-visible indicia adjacent the load wheel; and a sensor located in sensing relation with respect to said indicia and said sensor being in communication with the processor, wherein said sensor detects the presence of said indicia and communicates the presence of the indicia to the processor during the rotation of the load wheel.

2. The tire uniformity machine of claim 1 wherein said indicia are magnetic.

3. The tire uniformity machine of claim 1 wherein said indicia are supported on a surface of the load wheel.

4. The tire uniformity machine of claim 2 wherein said magnetic indicia are arranged in an alternating polarity configuration.

5. The tire uniformity machine of claim 2 wherein said indicia are carried by a strip supported on said load wheel.

6. The tire uniformity machine of claim 5 wherein said strip is axially located proximate to an edge of said load wheel.

7. The tire uniformity machine of claim 5 wherein said strip is carried on an outer surface of said load wheel.

8. The tire uniformity machine of claim 5 wherein said strip is carried on an inner surface of said load wheel.

9. The tire uniformity machine of claim 1 wherein said sensor is located proximate to said indicia.

10. The tire uniformity machine of claim 5 wherein said sensor is spaced from said indicia by about 0.01 millimeter to about 2.0 millimeter.

11. In a tire uniformity machine having a load wheel and a processor, an encoding assembly comprising:
   magnetic indicia carried by the load wheel; and
   a detector placed in sensing relation relative to the indicia for sensing the presence of the indicia, said detector being in communication with the processor, whereby upon sensing the indicia, said detector generates a signal and communicates said signal to the processor.

12. The encoder assembly of claim 11 wherein said indicia are attached to a surface of the load wheel.

13. The encoder assembly of claim 12 wherein the indicia are located such that they are not in contact with a test tire.

14. The encoder assembly of claim 13, wherein the indicia are axially located near an edge of the load wheel.

15. The encoder assembly of claim 11 wherein the indicia are covered by a protective layer.

16. The encoder assembly of claim 15 wherein the protective layer encapsulates the indicia and wherein the protective layer is mounted on the load wheel.

17. The encoder assembly of claim 11 wherein the magnetic indicia are arranged in alternating polarity configuration.

18. The encoder assembly of claim 17 wherein the magnetic indicia are housed within a protective sheath carried by the load wheel.

19. The encoder assembly of claim 18 wherein the protective sheath is attached to the load wheel by double-back tape.

20. In a tire uniformity machine having a load wheel and a processor, an encoding assembly comprising: a magnetic tape carried by the outer surface of the load wheel and axially located near the edge of the load wheel; and a detector placed in sensing relation to said magnetic tape for sensing magnetic particles within said tape and generating a signal communicated to the processor, wherein the processor transforms the signal into an angular velocity.

* * * * *